United States Patent
Blanding et al.

(10) Patent No.: US 10,029,808 B2
(45) Date of Patent: Jul. 24, 2018

(54) STRUCTURALLY INTEGRATED THERMAL MANAGEMENT SYSTEM FOR AEROSPACE VEHICLES

(71) Applicant: The Boeing Company, Chicago, IL (US)

(72) Inventors: David E. Blanding, Belton, SC (US); Arun Muley, San Pedro, CA (US); Jeffrey C. Coffman, Huntington Beach, CA (US); Doug Van Affelen, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 37 days.

(21) Appl. No.: 15/056,731

(22) Filed: Feb. 29, 2016

(65) Prior Publication Data
US 2017/0247126 A1 Aug. 31, 2017

(51) Int. Cl.
| | | |
|---|---|---|
| *B64G 1/50* | (2006.01) | |
| *B64C 3/18* | (2006.01) | |
| *B64D 13/08* | (2006.01) | |
| *B64C 9/00* | (2006.01) | |
| *B64C 13/50* | (2006.01) | |

(52) U.S. Cl.
CPC ............... *B64G 1/50* (2013.01); *B64C 3/185* (2013.01); *B64C 3/187* (2013.01); *B64C 9/00* (2013.01); *B64C 13/50* (2013.01); *B64D 13/08* (2013.01)

(58) Field of Classification Search
CPC .......... F28F 2260/02; F28F 2260/00; B64D 13/006; B64D 13/08; B64D 2013/0614; H02K 9/12; H02K 9/04; H02K 9/22; B64G 1/50; B64G 1/503; H05K 7/20854; B64C 3/18; B64C 3/185; B64C 3/187; B64C 9/00; B64C 13/50

USPC ............................................. 310/16, 54, 64
See application file for complete search history.

(56) References Cited

U.S. PATENT DOCUMENTS

| | | | |
|---|---|---|---|
| 4,819,720 A | 4/1989 | Howard | |
| 5,506,032 A | 4/1996 | Rowe | |
| 5,692,558 A * | 12/1997 | Hamilton | F28F 13/00 165/104.33 |
| 7,325,772 B1 * | 2/2008 | Hanewinkel | B64D 13/00 165/41 |
| 8,640,469 B2 * | 2/2014 | Mackin | B64D 13/08 62/244 |
| 9,422,060 B2 * | 8/2016 | Smith | B64D 13/06 |

(Continued)

FOREIGN PATENT DOCUMENTS

| | | |
|---|---|---|
| FR | 2937304 A1 | 4/2010 |
| WO | WO2008140972 A1 | 11/2008 |

OTHER PUBLICATIONS

European Patent Office; European Search Report issued in European Patent Application No. EP17158529 dated Jun. 30, 2017.

Primary Examiner — Tho V Duong
(74) Attorney, Agent, or Firm — Parsons Behle & Latimer

(57) ABSTRACT

Disclosed embodiments include a structurally integrated thermal management system that uses the structure of an aerospace vehicle as part of the heat dissipation system. In this system, structural elements of the aerospace vehicle function as a thermal bus, and are thermally connected with heat-generating electrical components, so that heat from those components is directed away from the component by the structure of the vehicle itself, into lower temperature surfaces of the vehicle.

20 Claims, 5 Drawing Sheets

(56) References Cited

U.S. PATENT DOCUMENTS

| | | | |
|---|---|---|---|
| 2006/0231233 A1* | 10/2006 | Farid | F28D 15/0266 165/10 |
| 2010/0132915 A1 | 6/2010 | Blanding | |
| 2013/0048262 A1* | 2/2013 | Ofoma | H05K 7/20445 165/185 |
| 2014/0001309 A1 | 1/2014 | Tieys et al. | |

* cited by examiner

STRUCTURALLY INTEGRATED THERMAL MANAGEMENT SYSTEM FOR AEROSPACE VEHICLES

FIELD OF THE DISCLOSURE

This disclosure generally relates to systems for removing heat generated by electrically powered subsystems and components, such as electromechanical actuators, onboard aerospace vehicles. More particularly, the present disclosure is directed to a structurally integrated thermal management system for an aerospace vehicle.

BACKGROUND

The increasing use of avionics, electrically powered subsystems, electric actuation systems ("EAS"), and the like, onboard commercial and military aerospace vehicles has led to a desire for improved thermal management of the heat loads produced by these electrical components. For example, aerospace vehicles with EAS, as opposed to hydraulically actuated control systems, are becoming more common. However, aerospace vehicles with EAS often include more actuators for ailerons, flaps, and other components, which produce more heat than comparable hydraulic actuators. Moreover, hydraulic actuation systems naturally transfer heat from their associated actuators by way of the hydraulic fluid, whereas EAS do not typically include such heat transfer systems.

Some current approaches to thermal management in aerospace vehicles are achieved with higher costs, possible reduction of overall component performance, decreased efficiency and/or increased weight. Effective management of thermal loads in aerospace vehicles is also affected by the trend toward the use of thermally conductive carbon fiber composites and other thermally conductive non-metallic materials for aircraft structural members and aircraft skin in order to reduce weight. Many common composite materials have lower thermal conductivity than metals, such as aluminum and, thus, while lighter they do not conduct away heat as efficiently. For certain military aerospace vehicles, there is also a desire to maintain smooth exterior surfaces with a minimum number of penetrations in order to increase stealth or other detection avoidance characteristics. This can further reduce the design options for managing thermal loads.

In addition, effective thermal management of electric components such as EAS is one of the greatest challenges for the More Electric Aircraft (MEA) due to, for example, limited heat sink capacity. Likewise, for future MEA aircraft using thinner wing cross sections, weight, size, and heat dissipation requirements will become even more challenging. Therefore, a structurally integrated actuation system and thermal management approach comprising load bearing actuators, new cooling techniques, and high-performance materials coupled with new packaging concepts is desirable.

In most existing systems, the EAS and other electric motors have been either liquid cooled or designed with sufficient metal to enhance its ability to provide a heat sink for the excessive heat that was generated during operation. Current MEA applications are not structurally integrated and either use a separate cooling loop that dumps heat into a fluid/air, or over-designs the electric motor and other various components to enhance their heat sinking capabilities. The use of a centralized coolant loop to handle the thermal load generated by distributed components entails increased system complexity, maintainability and concomitant weight and volume penalties.

Accordingly, there is a need for an improved cooling system for controlling heat loads generated by electrical components onboard aerospace vehicles. Other drawbacks with existing systems may also exist.

SUMMARY

Accordingly, disclosed embodiments address the above-identified needs and drawbacks. Disclosed embodiments include a structurally integrated thermal management system that uses the structure of an aerospace vehicle as part of the heat dissipation system. In this system, structural elements of the aerospace vehicle function as a thermal bus, and are thermally connected with heat-generating electrical components, so that heat from those components is directed away from the component by the structure of the vehicle itself, into lower temperature surfaces of the vehicle. In various embodiments, the heat-generating electrical component is directly mechanically attached to the structural element by a thermal boss, which provides a thermally conductive element for transmitting heat from the electrical component into the structural element. In other embodiments, the structural elements of the aerospace vehicle include thermally conductive portions or layers, which are particularly configured to conduct thermal energy away from the heat-generating electrical component through the structural element.

Disclosed embodiments include an aerospace vehicle, comprising a thermal bus that further comprises a structural element of the aerospace vehicle. Also include is a thermally active element in thermal communication with the thermal bus to dissipate heat from the thermally active element into the thermal bus.

Further disclosed embodiments may be ones in which the structural element is an aircraft wing spar or rib for an aircraft wing, and the thermally active element is an electrical device operative with the aircraft wing. In further embodiments, the electrical device comprises an EAS and related control electronics. In some embodiments the electrical device is supported by, and in thermal communication with, a thermal boss that mounts to the structural element. In some embodiments, the electrical device includes a thermally conductive element for conducting heat from an interior portion of the electrical device to an exterior portion casing.

Disclosed embodiments also include a thermal boss disposed between the structural element and the thermally active element to facilitate heat transfer. In some embodiments, a heat dissipating element may be in thermal communication with the thermal bus. In further embodiments, the heat dissipating element may include a thermal conducting element, and a heat spreader attached to the thermal conducting element. In still further embodiments, the thermal conducting element may be a perspiration cooler, a thermally conductive hydro gel material, one or more thermal straps, composite materials, pyrolytic graphite material, or graphite foam.

Also disclosed are methods of aerospace vehicle cooling. Embodiments include mounting a thermally active element (e.g., EAS 16) to a structural element (e.g., thermal bus 20, which may comprise a wing spar, wing rib, or other structural element), conducting heat from the thermally active element through the structural element to a dissipating element, and dissipating (920) the heat. In some embodiments, the dissipating step further comprises radiating the conducted heat from the structural element into the environment. In still further embodiments, the environment may be ambient air or a cooler structure in the aerospace vehicle.

Other disclosed embodiments include a thermal management system for an aerospace vehicle, including a thermally conductive boss, attached to a structural element of the aerospace vehicle, a thermally active device (e.g., EAS 16), attached to the thermal boss, and a heat transport element in thermal communication with the thermally conductive boss.

In some embodiments, the thermal management system also includes a heat dissipation element in thermal communication with the heat transport element. Disclosed embodiments may also include an aerospace vehicle surface exposed to ambient air in thermal communication with the heat dissipation element. In further disclosed embodiments, the heat dissipation element further comprises a resin layer and unidirectional carbon nanotubes. In some embodiments, the heat dissipation element further comprises a temperature sensitive hydro gel layer and a heat spreader.

Other disclosed embodiments of the thermal management system may include a micro-channel assembly in thermal communication with the thermally active device. In some embodiments, the micro-channel assembly may be an oblique micro channel assembly, an S-channel assembly, or a Wavy fin assembly.

Figure 1:
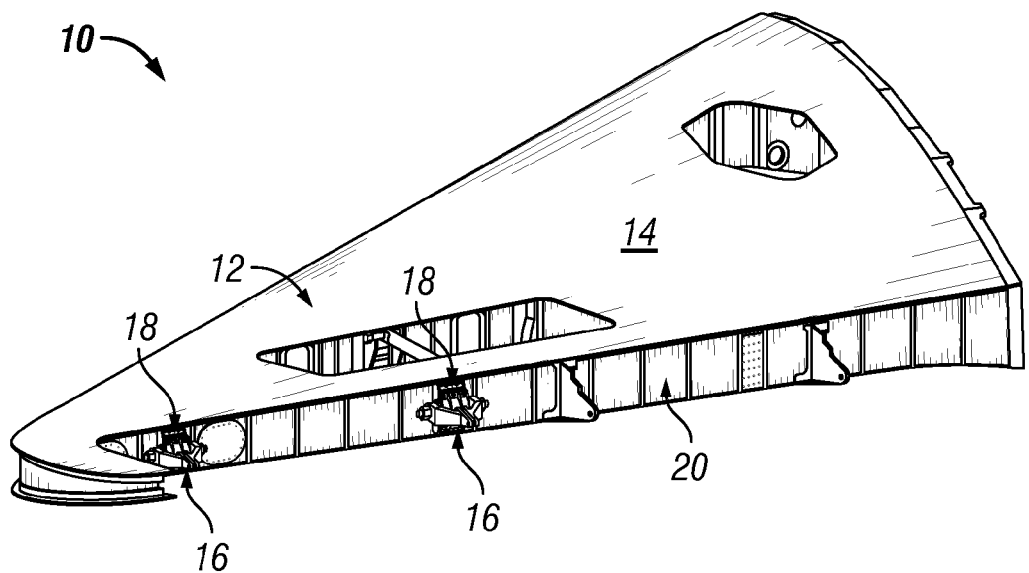
FIG. 1 is an isometric view of a structurally integrated thermal management system 10 for an aerospace vehicle in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

In the following description, a structurally integrated thermal management system 10 is presented in the context of an aerospace vehicle. However, it is to be understood that the thermal management system 10 disclosed herein is applicable to aerospace vehicles generally, including aircraft, spacecraft and satellites, and is not limited to use with a particular vehicle. It is also to be understood that while an EAS 16 is presented as an example of a heat-generating electrical device that can be associated with this system 10, the system 10 is equally applicable to other heat-generating devices, such as related EAS 16 control electronics, electrically powered subsystems, computers, avionics devices, and the like.

FIG. 1 is an isometric view of a portion of a structurally integrated thermal management system 10 for an aerospace vehicle in accordance with disclosed embodiments. In some embodiments, structurally integrated thermal management system 10 may comprise an aerospace vehicle wing 12. As is known, in addition to wing 12, an aerospace vehicle may also include other aerodynamic structures for lift and control, such as a rudders, ailerons, flaps, elevators, and the like (omitted in FIG. 1). The wing 12, rudders, ailerons, flaps, and other aerodynamic structures include moveable portions, as is well known. In large aerospace vehicles, these moveable control surfaces are typically power actuated by a hydraulic system in response to pilot inputs upon control devices, such as a control yoke and rudder pedals, because of the relatively large forces involved. Hydraulic actuators are connected to the moveable control surfaces throughout the aircraft, and move in response to pilot input upon the control devices located in the cockpit of the aircraft.

In recent years, there has been an increasing interest in electrically controlled and electrically actuated aerospace vehicles. This is due in part to the generally lower weight of EAS 16 compared to comparable hydraulic systems, and also to the greater use of computerized vehicle controls, rather than legacy mechanical controls. Because they directly operate in response to electrical signals, EAS 16 are more easily integrated with computerized electronic control systems than are hydraulic or other purely mechanical systems.

As shown in FIG. 1, wing 12 may comprise a wing surface 14. Embodiments of wing surface 14 may comprise a thermally conductive skin to, among other things, reflect or transfer heat, transfer heat through a composite skin layer, act as a heat spreader, transfer heat from inside the wing 10 to outside ambient air, be used for evaporative cooling, and the like. For example, embodiments of wing surface 14 may comprise thermally conductive paints applied on at least a portion of wing surface 14, carbon nano-infused resins, thermally conductive graphite foams, copper, silver, or other metallic skins, temperature sensitive hydro gels, or the like.

As also shown in FIG. 1, embodiments of a structurally integrated thermal management system 10 may also comprise one or more EAS 16. FIG. 1 depicts EAS 16 as a rotary electromechanical actuator, but the disclosure is not so limited and other EAS 16 may comprise a linear actuator, an electric motor, power electronics, a motor controller, or other heat generating source.

As also shown, each EAS 16 may be mounted on a thermal boss 18. Any suitable thermal boss 18 may be implemented to transfer heat from the EAS 16 to thermal bus 20 and secure EAS 16 in an appropriate place on wing 12. Thermal boss 18 may be shaped to optimize the heat transfer with the EAS 16. For example, if the outer surface of the EAS 16 is generally cylindrical, the thermal boss 18 may be reciprocally curved so that the EAS 16 and the thermal boss 18 make sufficient contact to efficiently transfer heat generated in EAS 16. Other shapes are also possible.

Embodiments of thermal boss 18 may be constructed out of any suitable material. For example, thermal boss 18 may be constructed out of a material that is durable enough to securely anchor the EAS 16 during operation and thermally conductive enough to optimally transfer heat away from the EAS 16. Exemplary materials for thermal boss 18 include, but are not limited to, metals, non-metals, pyrolytic graphite blocks, graphite foams, pyrolytic graphite strips, or straps, copper blocks, strips, or straps, temperature sensitive hydro gels, phase change materials, thermally conductive epoxy, thermally conductive polymers, thermally conductive pastes, and the like.

As also shown, embodiments of system 10 may comprise a thermal bus 20. Thermal bus 20 comprises a structural component of the aerospace vehicle. For example, as shown in FIG. 1, thermal bus 20 may comprise a wing spar, a wing rib 22 (shown in FIG. 2), or other structural component of wing 12. Thermal bus 20 is thermally conductive and may comprise metals, non-metals, pyrolytic graphite strips or straps, copper strips or straps, silver strips or straps, graphene, carbon nano tube straps or strips, or the like. In some embodiments, thermal bus 20 may comprise a portion, or portions, of the wing spar. For example, the upper 204 or lower spar cap 202, or the spar web 201 (shown in more detail in FIG. 2) may contain thermally conductive elements, while other portions of the wing spar or rib may be of a different thermal conductivity.

Figure 3:
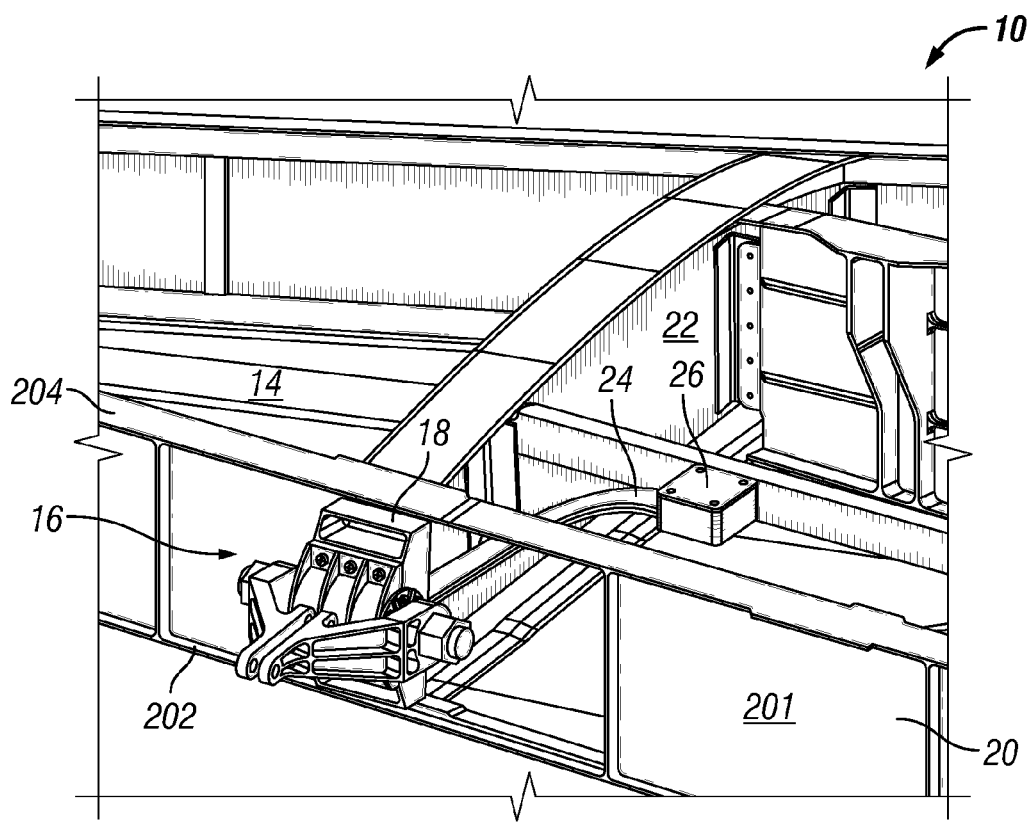
FIG. 3 is a close-up, isometric view, with some elements omitted for clarity, of another embodiment of a structurally integrated thermal management system 10 in accordance with the disclosure.

Embodiments of thermal bus 20 transfer the heat generated in the EAS 16 and transferred to the thermal boss 18 to an appropriate dissipation location. For example, for embodiments employing a thermally conductive wing surface 14, thermal bus 20 may transfer heat from EAS 16 to the wing surface 14 where heat may be exchanged with the ambient air around the wing surface 14. As discussed in more detail below, other embodiments of system 10 may comprise a heat transport element 24 (as shown in FIG. 3) that conducts heat to a heat dissipation element 26 (shown in FIG. 3), a heat transport element 24 that conducts heat to the wing surface 14, or combinations of the foregoing. Other embodiments are also possible.

Figure 2:
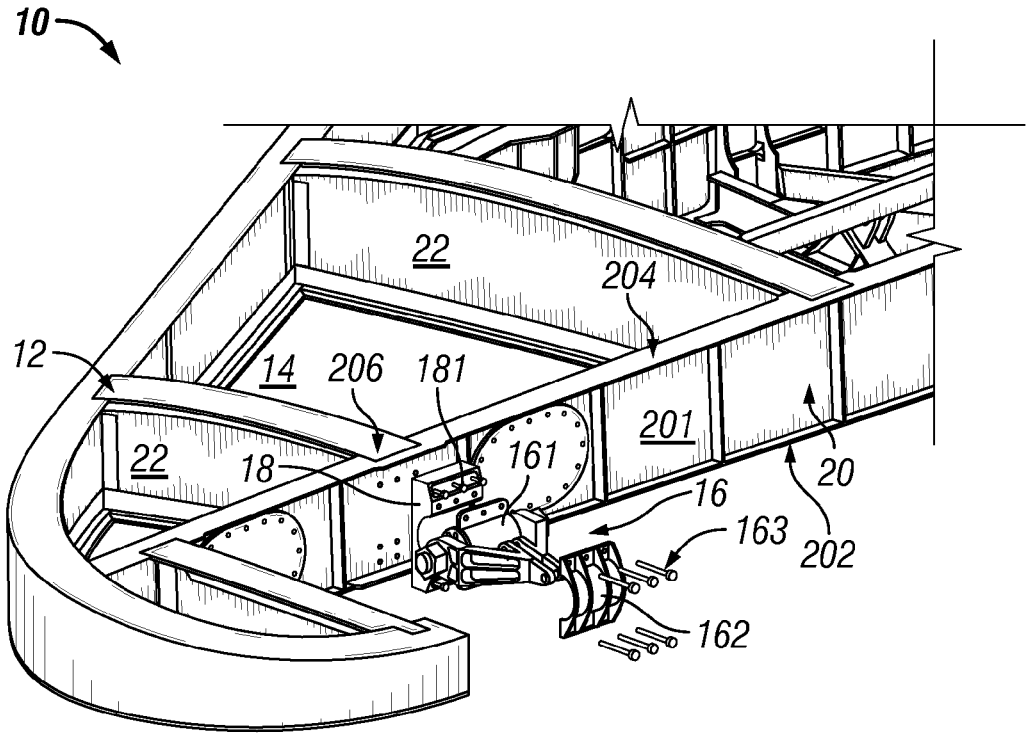
FIG. 2 is an exploded, close-up view of a structurally integrated thermal management system 10 in accordance with the present disclosure.

FIG. 2 is an exploded, close-up view of a structurally integrated thermal management system 10 in accordance with the present disclosure. As shown, embodiments of EAS 16 may comprise a rotary electric actuator 161 that mounts to thermal boss 18 and may be covered by an exterior portion casing, or a thermal cap 162 held in place by suitable cap fasteners 163. Thermal cap 162 may be used, among other things, to transfer heat generated in the EAS 16 to the thermal boss 18. Thermal cap 162 may comprise metals, non-metals, pyrolytic graphite strips or straps, copper strips or straps, temperature sensitive hydro gels, phase change materials, thermally conductive epoxy, thermally conductive polymers, thermally conductive pastes, or the like.

As also shown in FIG. 2, embodiments of thermal bus 20 that comprise a wing spar may further comprise a spar web 201, a lower spar cap 202, and an upper spar cap 204, each of which may be thermally conductive as desired, and as described above.

In FIG. 2, the upper portion of wing surface 14 is omitted so that wing ribs 22 are visible. As also shown, thermal bus 20 may comprise one or more shoulders, lips, or flanges 206 to, among other things, facilitate thermal contact and help support thermal boss 18 which may also be mounted to thermal bus 20 using suitable fasteners 181.

FIG. 3 is a close-up, isometric view, with some elements omitted for clarity, of another embodiment of a structurally integrated thermal management system 10 in accordance with the disclosure. As shown for this embodiment, a heat transport element 24 may be used to direct heat from EAS 16 to a desired location. For example, heat transport element 24 may conduct heat to a heat dissipation element 26. In some embodiments, heat transport element 24 and heat dissipation element 26 may comprise metals, non-metals, pyrolytic graphite strips or straps, copper skins, strips, or straps, silver skins, strips, or straps, graphene, carbon nano tube straps or strips, or the like.

Figure 4:
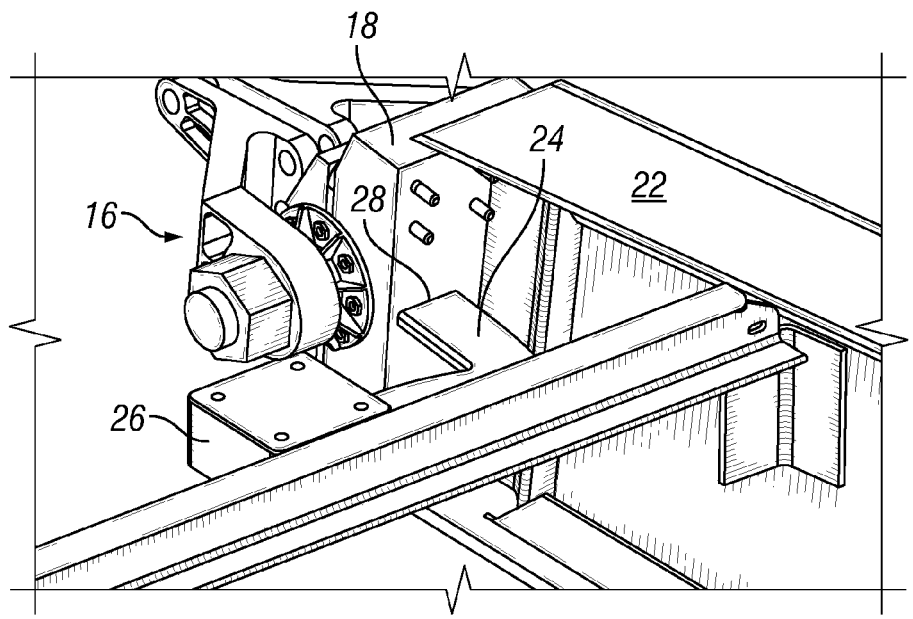
FIG. 4 is a close-up, isometric, rear view, with some elements omitted for clarity, of the embodiment of FIG. 3.

FIG. 4 is a close-up, isometric, rear view, with some elements omitted for clarity, of the embodiment of FIG. 3. As shown, heat transport element 24 may be connected to thermal boss 18 via a thermally conductive interface joint 28. In some embodiments, interface joint 28 may be mechanical (i.e., through contact such as a butt, scarf, or other joint), through thermally conductive polymers, pastes, epoxies, or the like, or through combinations of the foregoing.

In some embodiments, heat dissipation element 26 may dissipate heat from EAS 16 through wing surface 14. A thermally conductive adhesive, polymer, epoxy, or the equivalent may be used between heat dissipation element 26 and wing surface 14.

Figure 5:
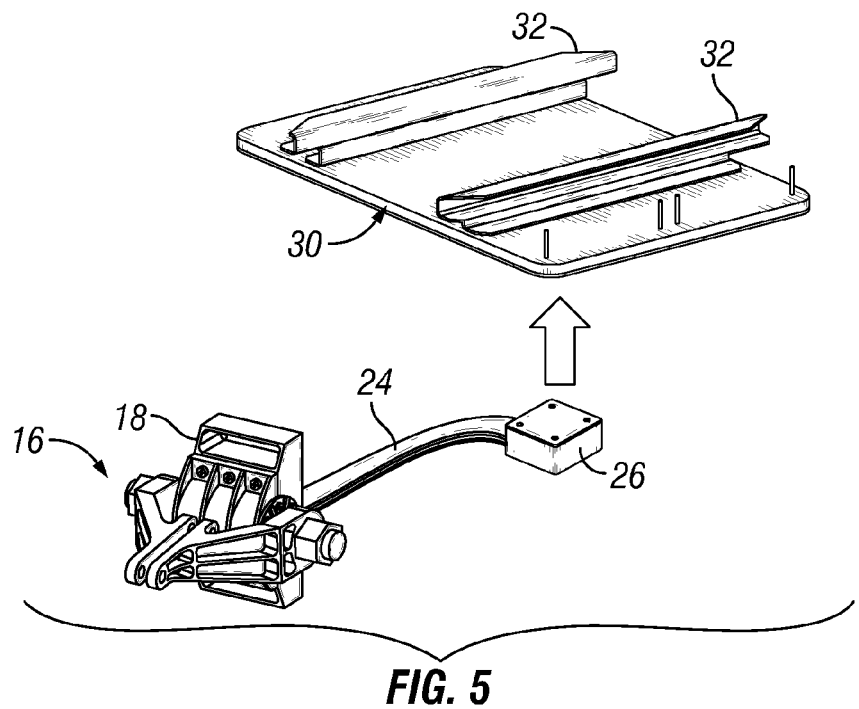
FIGS. 5 and 6 are schematic diagram illustrations of wing surface 14 heat dissipation embodiments in accordance with the disclosure.
Figure 6:
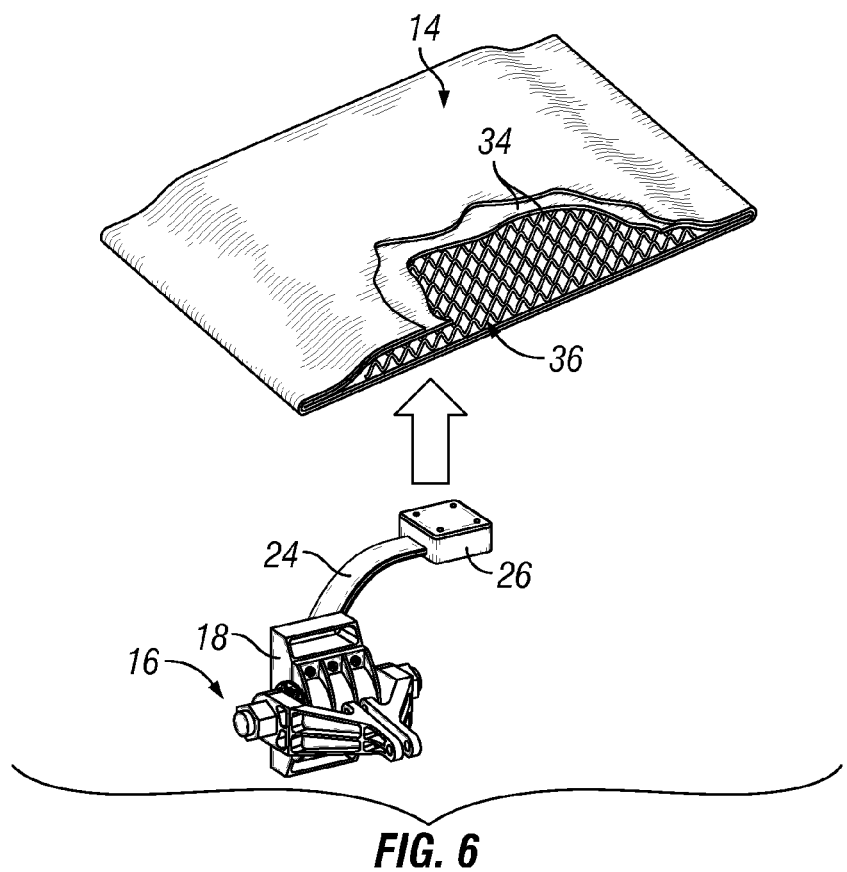

FIGS. 5 and 6 are schematic diagram illustrations of wing surface 14 heat dissipation embodiments in accordance with the disclosure. As shown in FIG. 5, heat generated in EAS 16 may be transferred through thermal boss 18 to heat transport element 24 and then to heat dissipation element 26. Layers of resin 30 may function as a heat spreading element and be reinforced with unidirectional carbon nanotubes 32 that function as thermal conducting elements and allow the heat to be conducted through the thickness of the wing surface 14 (omitted in FIG. 5) and then spread over wing surface 14 in order to improve thermal transfer efficiency.

As shown in FIG. 6, another embodiment may comprise a heat dissipation element 26 in contact with one or more layers of temperature sensitive hydro gel 34 that function as thermal conducting elements and transfer heat from EAS 16 to wing surface 14. Some embodiments may also include a thermally conductive heat spreader 36 to optimize heat transfer through the layers of hydro gel 34 to the wing surface 14. Heat spreader 36 may comprise a copper-graphene composite, or the like. In some embodiments, the layers of hydro gel 34 may "sweat" through a dedicated panel on wing surface 14 and, thus, boost the heat dissipation rate through evaporation. The hydro gel 34 layers may absorb moisture at low temperature to replenish.

Figure 7:
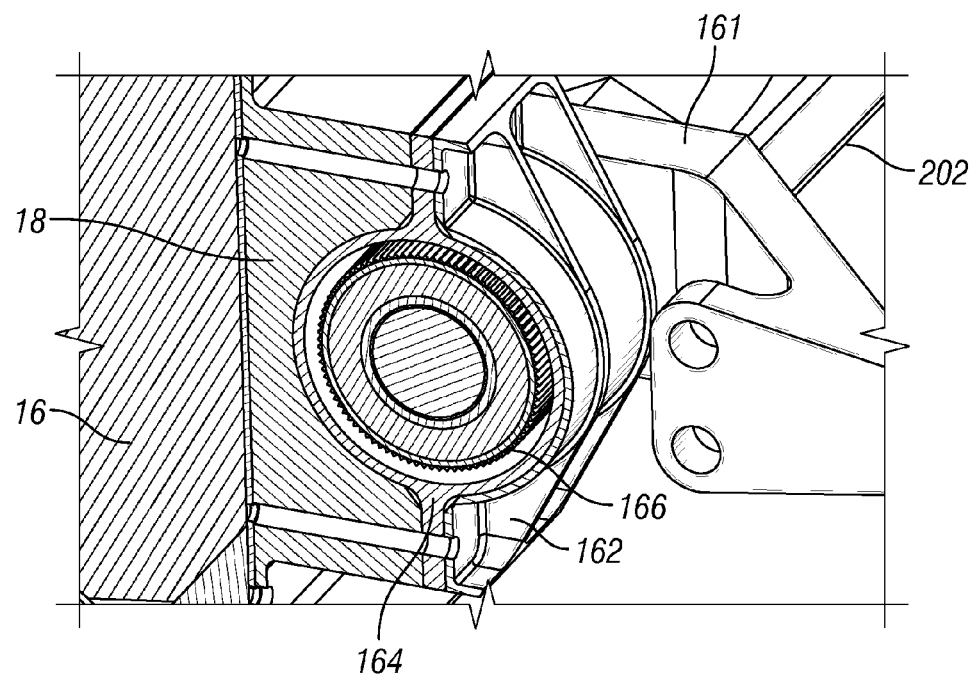
FIG. 7 is a cross-sectional view of some elements of a structurally integrated thermal management system 10 in accordance with the disclosure.

FIG. 7 is a cross-sectional view of some elements of a structurally integrated thermal management system 10 (not labeled on FIG. 7) in accordance with the disclosure. As shown, some embodiments of system 10 may comprise a thermally conductive interface material 164 in between thermal boss 18 and thermal cap 162. Interface material 164 may comprise metals, non-metals, pyrolytic graphite strips or straps, copper skins, strips, or straps, silver skins, strips, or straps, graphene, carbon nano tube straps or strips, epoxies, resins, polymers, or the like, and may be implemented to optimize the heat transfer from EAS 16.

As also shown, EAS 16 may comprise a rotary electric actuator 161 that comprises a motor with a micro-channel assembly 166 integrally formed on a portion of the actuator 161 (e.g., on the motor stator). Micro-channel assembly 166 may offer heat dissipation secondary flow paths that periodically disrupt the thermal boundary layer in the main channels and cause better fluid mixing, resulting in better cooling performance and lower wall temperatures within the electric motor and actuator 161.

Figure 8:
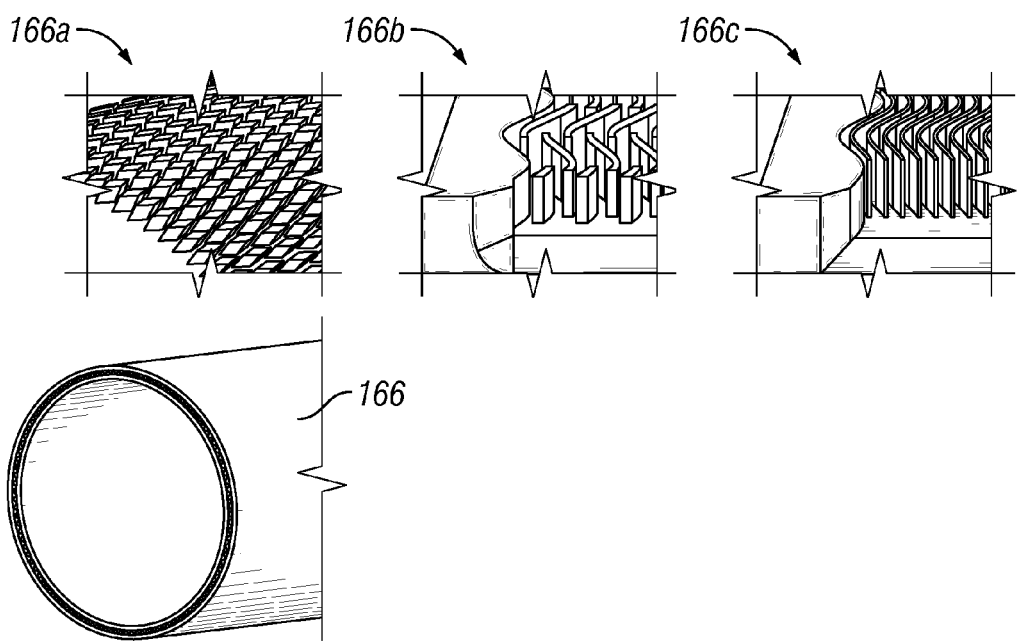
FIG. 8 is a schematic representation of embodiments of micro-channel assembly 166 in accordance with the disclosure.

FIG. 8 is a schematic representation of embodiments of micro-channel assembly 166 in accordance with the disclosure. As shown, micro-channel assembly 166 may comprise a variety of micro/mini-channels heat spreading concepts. For example, micro-channel assembly 166 may comprise oblique micro-channels 166a, S-Channels 166b, wavy fins 166c, or combinations thereof.

Figure 9:
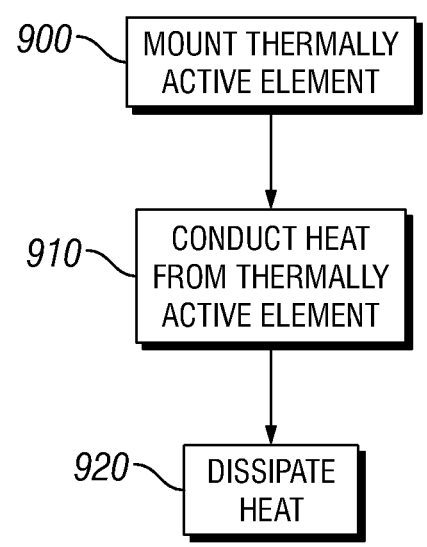
FIG. 9 is a flowchart representation of embodiments of methods for thermal management in accordance with the disclosure.

FIG. 9 is a flowchart representation of embodiments of methods for thermal management in accordance with the disclosure. As shown, and as should be understood from the above disclosure, a thermally active element (e.g., EAS 16) may be mounted at step 900 to a structural element (e.g., thermal buss 20, which may comprise a wing spar, wing rib, or other structural element) of the aerospace vehicle. At step 910 the heat generated in the thermally active element may be conducted away from the thermally active element to the structural element. At step 920 the heat that has been conducted away from the thermally active element may be dissipated. As disclosed above, dissipation may be accomplished by exposure of a dissipative surface to the ambient air or to a cooler structure in the aerospace vehicle. The cooler structure may comprise a structure that is at a lower temperature than the thermally active element.

Although various embodiments have been shown and described, the present disclosure is not so limited and will be understood to include all such modifications and variations are would be apparent to one skilled in the art.

What is claimed is:

1. An aerospace vehicle, comprising:
   a thermal boss (18) mounted on a thermal bus (20) comprising at least a portion of a wing spar or rib of the aerospace vehicle; and
   a thermally active element (16) supported by the thermal boss (18) and in thermal communication with the thermal bus (20) to dissipate heat from the thermally active element (16) into the thermal bus (20); and
   a heat dissipation element (26) in thermal communication with the thermal bus (20) wherein the heat dissipation element (26) further comprises:
      a temperature sensitive hydro gel layer (34); and
      a heat spreader (36).

2. The aerospace vehicle of claim 1, wherein the at least a portion of the wing spar (20) or rib (22) is part of an aircraft wing (12), and the thermally active element (16) is an electrical device operative with the aircraft wing (12).

3. The aerospace vehicle of claim 2, wherein the electrical device comprises an EAS (electric actuation system) and related control electronics (16).

4. The aerospace vehicle of claim 2, wherein the heat spreader (36) further comprises a copper-graphene composite.

5. The aerospace vehicle of claim 2, wherein the electrical device (16) includes a thermally conductive element (166) for conducting heat from an interior portion of the electrical device (16) to an exterior portion casing (162).

6. The aerospace vehicle of claim 2, wherein the hydro gel layer (34) is in thermal contact with a panel on the aircraft wing (12).

7. A method of aerospace vehicle cooling, the method comprising:
   mounting (900) a thermally active element (16) in a thermal boss (18) connected to a wing spar (20) or rib (22); and
   conducting (910) heat from the thermally active element (16) through at least a portion of the wing spar (20) or rib (22) to a dissipating element (26); and dissipating (920) the heat, wherein the dissipating element (26) further comprises:
      a temperature sensitive hydro gel layer (34); and
      a heat spreader (36).

8. The method of claim 7, wherein the dissipating step (920) further comprises radiating the conducted heat from the at least a portion of the wing spar (20) or rib (22) into the environment.

9. The method of claim 8 wherein the environment comprises ambient air.

10. The method of claim 8 wherein the environment comprises a cooler structure.

11. The method of claim 10, wherein the at least a portion of the wing spar (20) or rib (22) is part of an aircraft wing (12), and the thermally active element (16) is an electrical device operative with the aircraft wing (12).

12. The method of claim 11, wherein the electrical device comprises an EAS (electric actuation system) and related control electronics (16).

13. The method of claim 7, wherein the heat spreader (36) further comprises a copper-graphene composite.

14. A thermal management system (10) for an aerospace vehicle, comprising:
   a thermally conductive boss (18), attached to a wing spar (20) or rib (22) of the aerospace vehicle;
   a thermally active device (16), attached to the thermal boss (18);
   a heat transport element (24) in thermal communication with the thermally conductive boss (18); and
   a heat dissipation element (26) in thermal communication with the heat transport element (24) wherein the heat dissipation element (26) further comprises:
      a temperature sensitive hydro gel layer (34); and
      a heat spreader (36).

15. The thermal management system (10) of claim 14 wherein the wing spar (20) or rib (22) is part of a wing (12) of the aerospace vehicle, and the thermally active device (16) is an electrical device operative with the wing (12).

16. The thermal management system (10) of claim 14 further comprising:
   an aerospace vehicle surface (14) exposed to ambient air in thermal communication with the heat dissipation element (26).

17. The thermal management system (10) of claim 15 wherein the electrical device comprises an EAS (electric actuation system) and related control electronics (16).

18. The thermal management system (10) of claim 14 wherein the heat spreader (36) further comprises a copper-graphene composite.

19. The thermal management system (10) of claim 14 further comprising:
   a micro-channel assembly (166) in thermal communication with the thermally active device (16).

20. The thermal management system of claim 19 wherein the micro-channel assembly comprises at least one of an oblique micro channel assembly (166a), an S-channel assembly (166b), or a Wavy fin assembly (166c).

* * * * *